United States Patent
Duncan

(10) Patent No.: US 11,086,554 B2
(45) Date of Patent: Aug. 10, 2021

(54) WRITING SAME DATA ON A STORAGE SYSTEM

(71) Applicant: Micron Technology, Inc., Boise, ID (US)

(72) Inventor: Kevin R. Duncan, Ramsey, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/600,784

(22) Filed: Oct. 14, 2019

(65) Prior Publication Data

US 2020/0042187 A1  Feb. 6, 2020

Related U.S. Application Data

(63) Continuation of application No. 15/891,584, filed on Feb. 8, 2018, now Pat. No. 10,481,827.

(51) Int. Cl.
*G06F 3/06* (2006.01)
*G06F 13/16* (2006.01)
*G06F 13/28* (2006.01)

(52) U.S. Cl.
CPC ............. *G06F 3/065* (2013.01); *G06F 3/061* (2013.01); *G06F 3/0619* (2013.01); *G06F 3/0656* (2013.01); *G06F 3/0659* (2013.01); *G06F 3/0688* (2013.01); *G06F 13/1673* (2013.01); *G06F 13/28* (2013.01)

(58) Field of Classification Search
CPC ............................... G06F 3/065; G06F 3/0656
See application file for complete search history.

(56) References Cited

U.S. PATENT DOCUMENTS

| | | | |
|---|---|---|---|
| 10,481,827 B2 * | 11/2019 | Duncan | G06F 3/0656 |
| 2008/0184001 A1 | 7/2008 | Stager | |
| 2013/0151663 A1 | 6/2013 | He et al. | |
| 2018/0307418 A1 * | 10/2018 | Brown | G06F 3/067 |

* cited by examiner

*Primary Examiner* — Edward J Dudek, Jr.
(74) *Attorney, Agent, or Firm* — Brooks, Cameron & Huebsch, PLLC

(57) ABSTRACT

A command to duplicate data on a storage system is received from a host system, and in response to receiving the command, data corresponding to the command is retrieved from host memory of the host system. A plurality of write operations are performed on one or more memory devices of the storage system to fulfill the command, wherein performing each one of the plurality of write operations comprises writing the data to the one or more memory devices of the storage system without a subsequent retrieval of the data from the host memory.

20 Claims, 4 Drawing Sheets

WRITING SAME DATA ON A STORAGE SYSTEM

PRIORITY INFORMATION

This application is a Continuation of U.S. application Ser. No. 15/891,584, filed on Feb. 8, 2018, the contents of which are incorporated herein by reference.

TECHNICAL FIELD

The present disclosure relates generally to storage systems, and more specifically to writing the same data on a storage system.

BACKGROUND

A storage system (e.g., solid-state drive (SSD)) can include one or more memory components that store data. For example, an SSD may include memory devices such as non-volatile memory devices. The SSD may further include an SSD controller that may manage each of the memory devices and allocate data to be stored at the memory devices. A host system may utilize the SSD and request data from the SSD. The SSD controller may be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
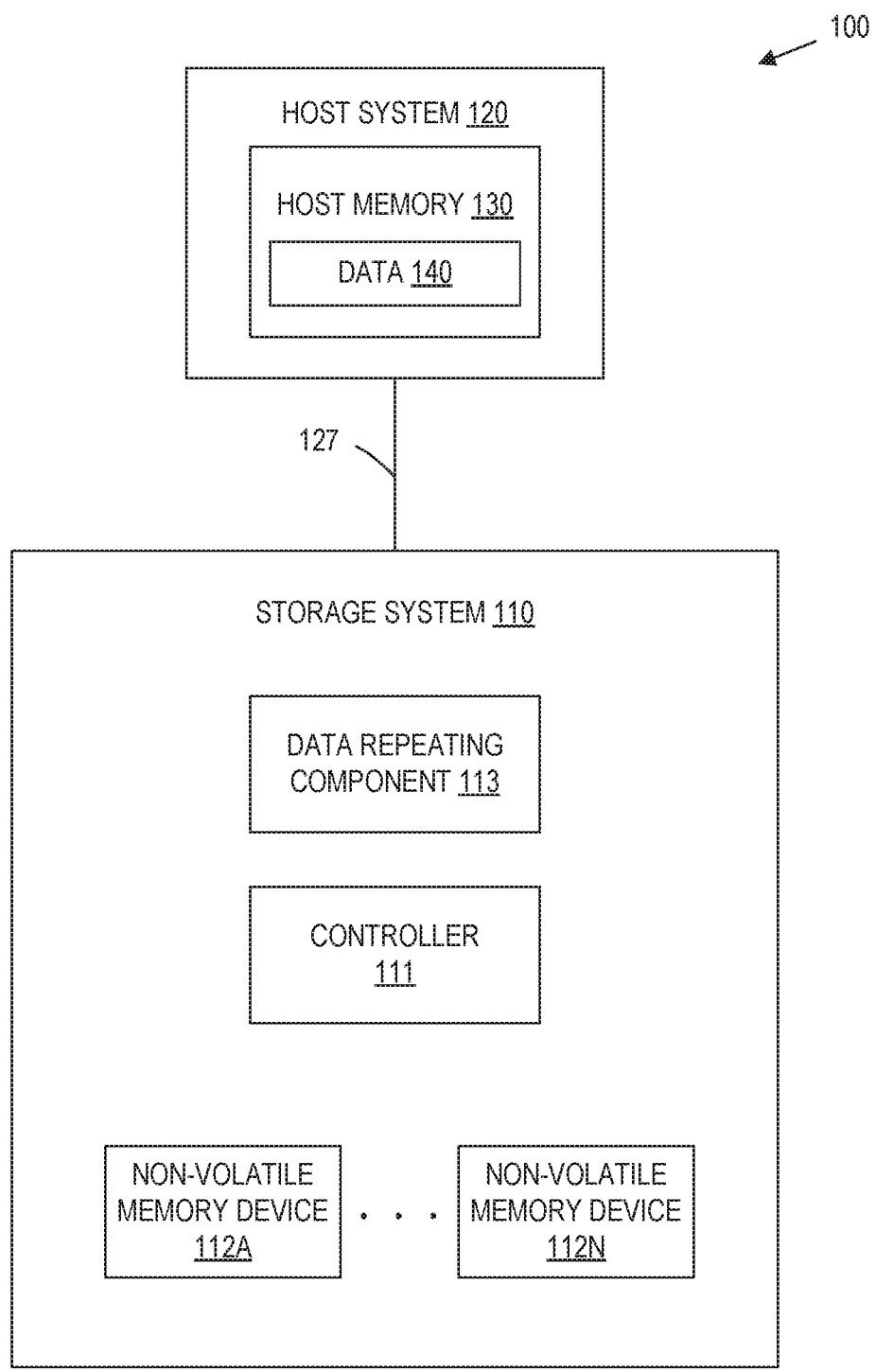
FIG. 1 illustrates an example computing environment that includes a storage system, in accordance with some embodiments of the present disclosure.

Aspects of the present disclosure are directed to writing the same data, for example, in association with executing a write same command, on a storage system. As used herein, the write same command is a message sent from a host system to a storage system requesting that data be written, a quantity of times, to the memory devices of the storage system. Storage systems, such as solid state drives (SSDs), are configured to execute write commands received from host systems. The particular data corresponding to the write command typically resides on host memory (e.g., main memory) on the host system. Accordingly, executing the write command can involve the storage system fetching the data, via a bus, from the host memory.

In various instances, it may be desirable to repeatedly write the same data (e.g., a block of data having a specific data pattern and which may be referred to as a "chunk" or a "page") to the storage system. For instance, it might be desirable to repeatedly write a particular data pattern of all "0s", all "1s", or a particular combination of "0s" and "1s" to a relatively large storage space (e.g., logical address range or physical address range) of the storage system, which may correspond to a multiple of the "write size" (e.g., page size) of the storage system (e.g., a write size of 2 KB, 4 KB, etc.).

With conventional storage systems, repeatedly writing data of a particular data pattern to the storage system typically involves multiple instances of fetching the data from the host memory. For example, if the write size of the memory device(s) of the storage system is 4 KB, writing a same 4 KB block of data to 128 KB of storage space can involve performing 32 (128 KB/4 KB=32) write operations (e.g., the same write operation is duplicated 32 times). If the 4 KB block of data to be repeatedly written resides in host memory, writing the 128 KB of storage space might involve the SSD fetching the 4 KB block from the host memory 32 separate times. It can be beneficial to reduce bus traffic (e.g., between a host and a storage system) in order to improve system performance, for instance.

Aspects of the present disclosure address the above and other deficiencies for performing a write same command by storing data on a local buffer of a storage system and utilizing the buffer to repeatedly write the data to memory device(s) of the storage system without incurring more host bus traffic or data fetch latency. To perform the write same command, the storage system performs one or more write operations (e.g., write same operations). As used herein, a write same operation is a write operation that transfers the data, specified by a command (e.g., write same command) from a buffer of the storage system to one or more memory devices of the storage system without subsequent retrievals of the data from the host memory.

Several embodiments of the present disclosure are associated with performing a write same command that involves fetching the block of data to be repeatedly written to storage system only once (e.g., a single time) from host memory. In a number of embodiments, the write same data retrieved from host memory can be stored in a dedicated write same data buffer of the storage system, which can allow access to the write same data for subsequent write same operations corresponding to the write same command without having to access host memory.

Additionally, storing the write same data in the dedicated write same data buffer can provide the ability for the storage system to delay performance of write same operations corresponding to a write same command being executed in order to service other data commands (e.g., host commands involving read and/or write access to memory devices of the storage system) and then later resume execution of the write same command by accessing the write same data from the write same data buffer. Providing the ability to delay execution of a write same command can provide various benefits such as allowing a storage system to service high priority data commands without having to wait until a write same command is complete, among other benefits. Providing the ability to delay execution of a write same command can also allow the storage system to operate on whatever is most efficient at the time. In the case of NAND (e.g., logical operations), the channels that are accessed by the write same command may be busy such that other operations that utilize other channels can be operated on.

The embodiments described herein can reduce traffic on a bus used to transfer commands and/or data between a host system and a storage system (e.g., from the host memory to the memory device(s) of the storage system). For instance, the write same data can be transferred once from the host memory to the write same data buffer of the storage system.

Subsequently, the write same data can be transferred a quantity of times from the write same data buffer to the memory devices of the storage system without utilizing the bus.

FIG. 1 illustrates an example computing environment 100 that includes a storage system 110, in accordance with some embodiments of the present disclosure. An example of a storage system 110 is a solid-state drive (SSD). In general, the computing environment 100 can include a host system 120 that uses the storage system 110. For example, the host system 120 may write data to the storage system 110 and read data from the storage system 110. The host system 120 can be a computing device such as a desktop computer, laptop computer, network server, mobile device, or such computing device that includes a memory and a processing device. The host system 120 can include or be coupled to the storage system 110 so that the host system 120 can read data from or write data to the storage system 110. The host system 120 can be coupled to the storage system 110 via a physical host interface 127. As used herein, "coupled to" generally refers to a connection between components, which may be an indirect communicative connection or direct communicative connection (e.g., without intervening components), whether wired or wireless, including connections such as, electrical, optical, magnetic, etc.

Examples of a physical host interface 127 include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface 127 can be used to transmit data between the host system 120 and the storage system 110. The host system 120 can further utilize an NVM Express (NVMe) interface to access the memory devices 112A to 112N when the storage system 110 is coupled with the host system 120 by the PCIe interface. The interface 127 can provide an interface for passing control, address, data, and other signals between the storage system 110 and the host system 120. The host system 120 can include host memory 130. The host memory 130 can be, for example, dynamic random access memory (DRAM), a flash drive (e.g., universal serial bus (USB) flash drive), and/or a non-volatile memory host control interface (NVMHCI) flash device.

The host memory 130 can store data 140. The host system 120 can generate and send a command to the storage system 110 to instruct the storage system to duplicate the data 140 on at least a portion of one or more memory devices 112A-112N. The data 140 can be transferred from the host memory 130 of the host system 120 utilizing one or more buses. For example, the data 130 can be moved from the host memory 130 to a physical interface of the storage system (e.g., via a bus).

The bus can include a data bus (DQ bus), a control bus, and/or an address bus, among other types of buses. The bus(es) can have various types of bus structures including, but not limited to, bus structures related to Open NAND Flash interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), PCIe, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

As shown in FIG. 1, the storage system 110 includes a controller 111 and memory devices 112A to 112N. In some embodiments, the memory devices 112A to 112N may be based on non-volatile memory. For example, the memory devices 112A to 112N may be a negative-and (NAND) type flash memory. Each of the memory devices 112A to 112N can include one or more arrays of memory cells such as single level cells (SLCs), multi-level cells (MLCs), or quad-level cells (QICs). Each of the memory cells may store bits of data (e.g., data blocks) used by the host system 120. Although non-volatile memory devices such as NAND type flash memory are described, the memory devices 112A to 112N may be based on any other type of memory. For example, the memory devices 112A to 112N may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, and electrically erasable programmable read-only memory (EEPROM). Furthermore, the memory cells of the memory devices 112A to 112N may be grouped as memory pages or data blocks that may refer to a unit of the memory device used to store data.

The controller 111 can communicate with the memory devices 112A to 112N to perform operations such as reading data, writing data, or erasing data at the memory devices 112A to 112N and other such operations. The controller 111 can include hardware such as one or more integrated circuits and/or discrete components, software such as firmware or other instructions, or a combination thereof. In general, the controller 111 can receive commands or operations from the host system 120 and can convert the commands or operations into instructions or appropriate commands to achieve the desired access to the memory devices 112A to 112N. The controller 111 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N.

Referring to FIG. 1, the storage system 110 includes a data repeating component 113 that can be used to repeatedly write the same data (e.g., at least a portion of data 140) to the memory devices 112A to 112N. Further details with regards to the operations of the data repeating component 113 are described below.

The storage system 110 can include additional circuitry or components that are not illustrated. For example, the storage system 110 may include a cache or buffer (e.g., DRAM) and address circuitry (e.g., a row decoder and a column decoder) that may receive an address from the controller 111 and decode the address to access the memory devices 112A to 112N.

Figure 2:
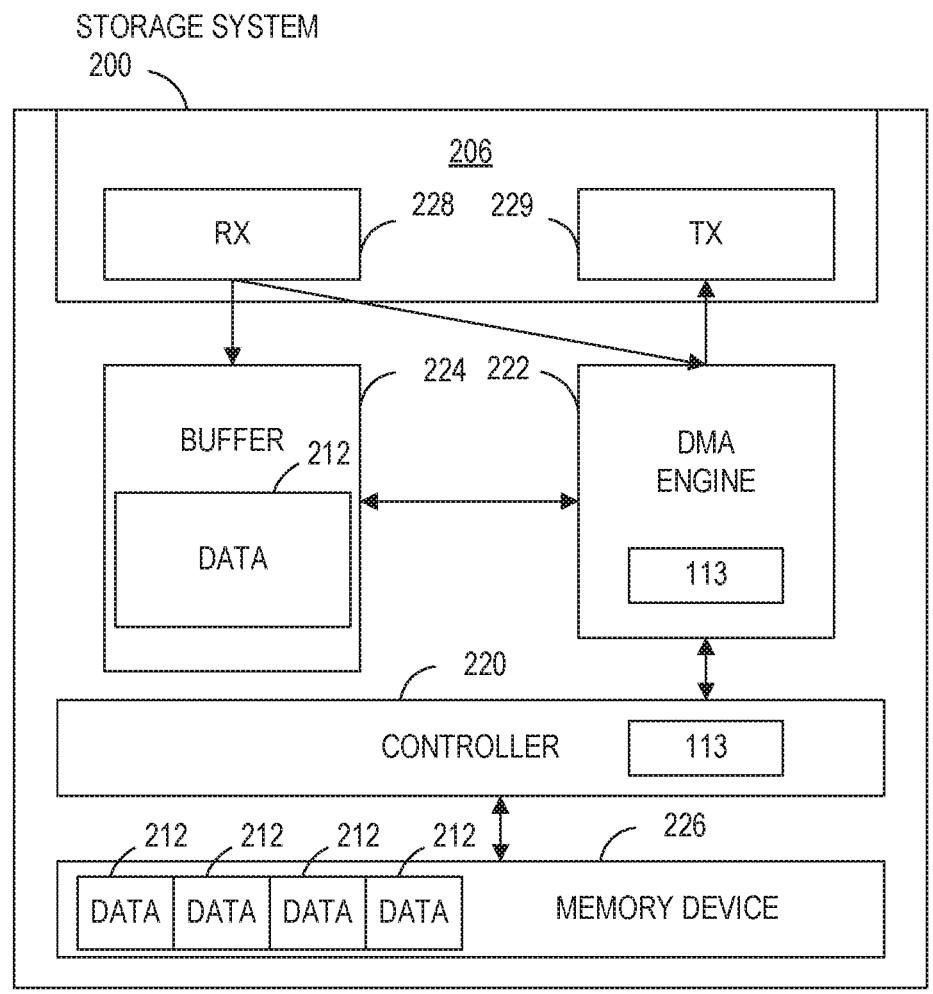
FIG. 2 illustrates an example storage system, in accordance with some embodiments of the present disclosure.

FIG. 2 illustrates an example storage system 200, in accordance with some embodiments of the present disclosure. The storage system 200 can receive a command, such as a "write same command" from a host system (e.g., host system 120 in FIG. 1) and the data 212 specified by the command through an interface 206. A "write same command" is used throughout this document as an example command for duplicating host data on a storage system. The write same command can write a given block of data a number of times to consecutive blocks on a memory device starting at a logical block address. The interface 206 includes a receiving interface (RX) 228 and a transmitting interface (TX) 229. The storage system 200 includes a controller 220, a DMA engine 222, a buffer 224, and one or more memory devices 226 (e.g., memory devices 112A-N in FIG. 1). The storage system 200 can be, for example, an SSD used as data storage for a host system (e.g., host system 120 in FIG. 1). The storage system 200 can also be a different type of storage device to store data for the host.

The controller 220 can communicate with a host system 120, the DMA engine 222, and/or the buffer 224 through a bus local to the storage system 200. The controller 220, DMA engine 222, buffer 224 and memory device 226 can be coupled to each other. The DMA engine 222 and/or controller 220 can include the data repeating component 113 of FIG. 1 and/or sub-components of data repeating component 113 to retrieve the data 212 from host memory and store the data 212 in the buffer 224. The data repeating component 113 can use the data 212 stored in the buffer 224 to repeatedly write the data 212 to the memory device(s) 226 on the storage system 200. The functionality of the data repeating component 113 can be implemented by the controller 220 and/or one or more components (e.g., DMA engine 222) within the storage system 200, as described in greater detail below.

For example, the controller 220 can receive the write same command. The controller 220 can retrieve data 212, pertaining to the write same command, from the buffer 224 utilizing the DMA engine 222. The controller 220 can also receive the data 212 from the host memory (e.g., host memory 130 in FIG. 1) using the DMA engine 222. The controller 220 can store the data 212 in one or more memory devices 226 of the storage system 200. Subsequent retrievals for the data 212 can be retrieved from the buffer 224.

The data 212 can be transferred to the memory device 226 one or more times to store the data 212 in one or more blocks of the memory device 226, for example. The blocks of the memory device 226 can be written to (e.g., marked, signed, and/or filled) after the block of the memory device 226 is deleted. For example, a number of blocks of the memory device 226 can be deleted and the data 212 can be transferred and stored in the number of blocks using the write same command and one or more operation (e.g., write same operations).

The write same command can also be used to designate a beginning and/or an end of a number of blocks of the memory device 226. In some examples, the data 212 can constitute a signature and/or a pattern that is identifiable to mark portions of the memory device 226 such as a beginning and/or an end of the number of blocks. A number of copies of the data 212 can also be a signature and/or a pattern. For example, a first instance, a second instance, and/or a third instance, of the data 212, combined can constitute a signature and/or a pattern.

The DMA engine 222 can generate addresses and initiate memory read and/or write cycles for the buffer 224 and/or the memory device 226. The DMA engine 222 can include one or more hardware registers that can be written to and/or read by the controller 220. For example, the DMA engine 222 can include a memory address register, a byte count register, and/or one or more control registers, among other registers. The registers can store a source of the data 212, a destination of the data 212, a direction of the transfer of the data 212, and/or the size of the data 212, among other uses for the registers of the DMA engine 222. The DMA engine 222 can be coupled to the buffer 224 and the memory device 226. The DMA engine 222 can transfer the data 212 from the buffer 224 to the controller 220 and/or the memory device 226. For example, the DMA engine 222 can perform a number of operations (e.g., write same operations) that are provided to the DMA engine 222 by the controller 220.

The buffer 224 can store the data 212. The buffer 224 can be physical memory storage used to temporarily store data as the data is being transferred from the host system (e.g., host system 120 in FIG. 1) to the memory device(s) 226 as part of performing the write same command.

The buffer 224 can be a dedicated buffer or a shared buffer. The dedicated buffer is a buffer that is used for a single purpose, a limited quantity of purposes, a single operation, a limited quantity of operations, and/or a single command. For example, the buffer 224 can be used to store the data 212 specified by a write same command as the data 212 is being transferred to the memory device 226. The buffer 224 can be accessed to perform an operation (e.g., write same operation) or operations utilized to perform write same operations.

The buffer 224 can also be a shared buffer. For example, the buffer 224 can be used for multiple purposes and/or multiple operations.

A size of the buffer 224 can be equal to a size of the interface 206 and/or a maximum allowable transfer size of the interface 206. For example, if a maximum allowable transfer size of the interface 206 is 4096 bits, then the size of the buffer 224 can be equal to 4096 bits. A size of the buffer 224 can be greater or smaller than the maximum allowable transfer size of the interface 206. In some examples, there may be a relationship between the size of the buffer 224 and a maximum size of the repeating pattern the storage system 200 can generate using the data 212 or a multiple of the repeating pattern. For example, there may be a relationship between the size of the buffer 224 and the size of a NAND page and/or the size of a sector in the memory device 226.

In some examples, a size of the data 212 can be a same size as a size of the buffer 224. For example, the size of the data 212 may be 4096 bits, which may be the size of the buffer 224. In another example, a size of the data 212 can be smaller than the size of the buffer 224. For example, the size of the data 212 may be less than 4096 bits.

In examples where the size of the data 212 is smaller than the size of the buffer 224, the unused bits of the buffer 224 can be used to store a signature identifying the used bits from the unused bits. The signature can include a bit pattern. The bit pattern can be all "1" bits, all "0" bits, or a combination of "0s" and "1s". The signature can include other bit patterns than those described herein.

In some examples, a size of the buffer 224 can be a multiple of the size of the data 212. For example, the data 212 may be 2048 bits or 1024 bits, among other sizes of the data 212. In such examples, the data 212 can be transferred from the host memory (e.g., host memory 130 in FIG. 1) to the buffer 224. The data 212 can then copied from a used portion of the buffer 224 to the unused portion of the buffer 224 a quantity of times to utilize the entire buffer 224.

Transferring the data 212 from the buffer 224 can include transferring a portion of the data in the buffer 224 or all of the data in the buffer 224. For example, if a size of the data 212 is smaller than a size of the buffer 224, the DMA engine 222 can transfer a portion of the data in the buffer 224, where a size of the portion is equal to the size of the data 212.

In some examples, a size of the data 212 matches a size pertaining to execution of an operation (e.g., write same operation). The size of the data 212 can be equal to a size of the data written when performing a write same operation. In another example, the size of the data 212 may be equal to a size of the data written by performing one or more write same operations.

The Rx 228 can be coupled to the buffer 224 and/or the DMA engine 222. The Rx 228 can be configured to process and/or provide the write same command and/or the data 212 to the buffer 224, the DMA engine 222, and/or the controller 220. For example, the Rx 228 can receive the write same command from the host system (e.g., host system 120 in FIG. 1) through a bus coupling the storage system 200 to the host system. The Rx 228 can provide the write same command to the controller 220 through the DMA engine 222.

The Rx 228 can also receive the data 212 via the bus. The Rx 228 can provide the data 212 to the buffer 224 and/or the DMA engine 222. For example, the Rx 228 can provide the data 212 to the buffer 224 and the DMA engine 222 concurrently (e.g., at a same time). Providing the data 212 concurrently to the buffer 224 and the DMA engine 222 can allow the DMA engine 222 to provide the data 212 to the controller 220 without having to retrieve the data 212 from the buffer 224. For example, providing the data 212 concurrently can utilize less operations than providing the data 212 to the DMA engine 222 or the buffer 224 independently.

In some examples, the data 212 can be transferred from the host memory (e.g., host memory 130 in FIG. 1) to the buffer 224 through the DMA engine 222. For example, the Rx 228 can transfer the data 212 to the DMA engine 222. The DMA engine 222 can then store the data 212 in the buffer 224, the controller 220, and/or the memory device(s) 226.

The Tx 229 can be configured to transfer data and/or commands from the DMA engine 222 to the host system (e.g., host system 130). For example, the Tx 220 can transfer a read command from the DMA engine 222 to the host system 130 to request data from the host system 130. For example, the Tx 229 can transfer a read command from the DMA engine 222 to the host memory (e.g., host memory 130 in FIG. 1) of the host system 120 to request that the data 212 in the host memory 130 be transferred to the Rx 228. The data 212 can then be transferred to the buffer 224, the DMA engine 222, and/or the controller 220.

The memory device(s) 226 can store the data 212. In some examples, the memory device 226 can store one or more instances of the data 212. As shown in FIG. 2, four different instances of the data 212 can be stored in the memory device 226. For example, four write same operations can transfer four instances of the data 212 from the buffer 224 to the memory device 226 through the controller 220. In some examples, the data 212 can be copied to the memory device 226 more than four times or less than four times.

The four instances of the data 212 can occupy consecutive and adjacent blocks of the memory device 226. For example, a last memory address of the first block corresponding to a first instance of the data 212 can directly precede a first memory address of the second block corresponding to the second instance of the data 212. A last memory address of the second block corresponding to the second instance of the data 212 can directly precede a first memory address of the third block corresponding to the third instance of the data 212. A last memory address of the third block corresponding to the third instance of the data 212 can directly precede a first memory address of the fourth block corresponding to the fourth instance of the data 212.

A total size of the instances of the data 212 stored in the memory device 226 can be a size specified by the command (e.g., write same command) received from the host system 120. For example, the write same command received from the host system 120 can designate and/or provide a size of a destination block of the memory device 226 that is to store one or more instances of the data 212. The size of the write same command can correspond to a total amount of data to be written to the memory device(s) 226 in association with executing the write same command.

In some examples, a size of the data from executing one set of write same operations and a second set of write same operations can be a fraction of the size specified by the write same command. For example, a size of the data from executing the first set of write same operations can be smaller than the size specified by the write same command. A size of the data from executing a write same operation can be a size of the data 212 and/or the size of the buffer 224. The size of data from executing the write same command can be a multiple of a write size of the memory device 226. A size of data from executing the write same command can be a multiple of a size of the buffer 224.

The controller 220 can transfer the data 212 to the memory device 226 by receiving the data 212 and transferring the data 212 to the memory device 226. In some examples, the buffer 224 can be coupled directly to the memory device 226 such that the data 212 is transferred directly from the buffer 224 to the memory device 226. The data 212 can also be transferred from the buffer 224 to the memory device 226 through the controller 220 and/or the DMA engine 222.

Utilizing the buffer 224 to write the data 212 a quantity of times to the memory device(s) 226 can include transferring the data 212 once through a buffer (not shown) of the host system 120. Limiting the number of transfers of the data 212 to a single transfer through the buffer can allow the buffer to be used for different purposes as the write same command is being performed. Furthermore, transferring the data 212 a number of times from the buffer 224 to the memory device(s) 226 can be performed in less time than transferring the data 212 a number of times through the bus to store the data 212 in the memory device(s) 226.

Figure 3:
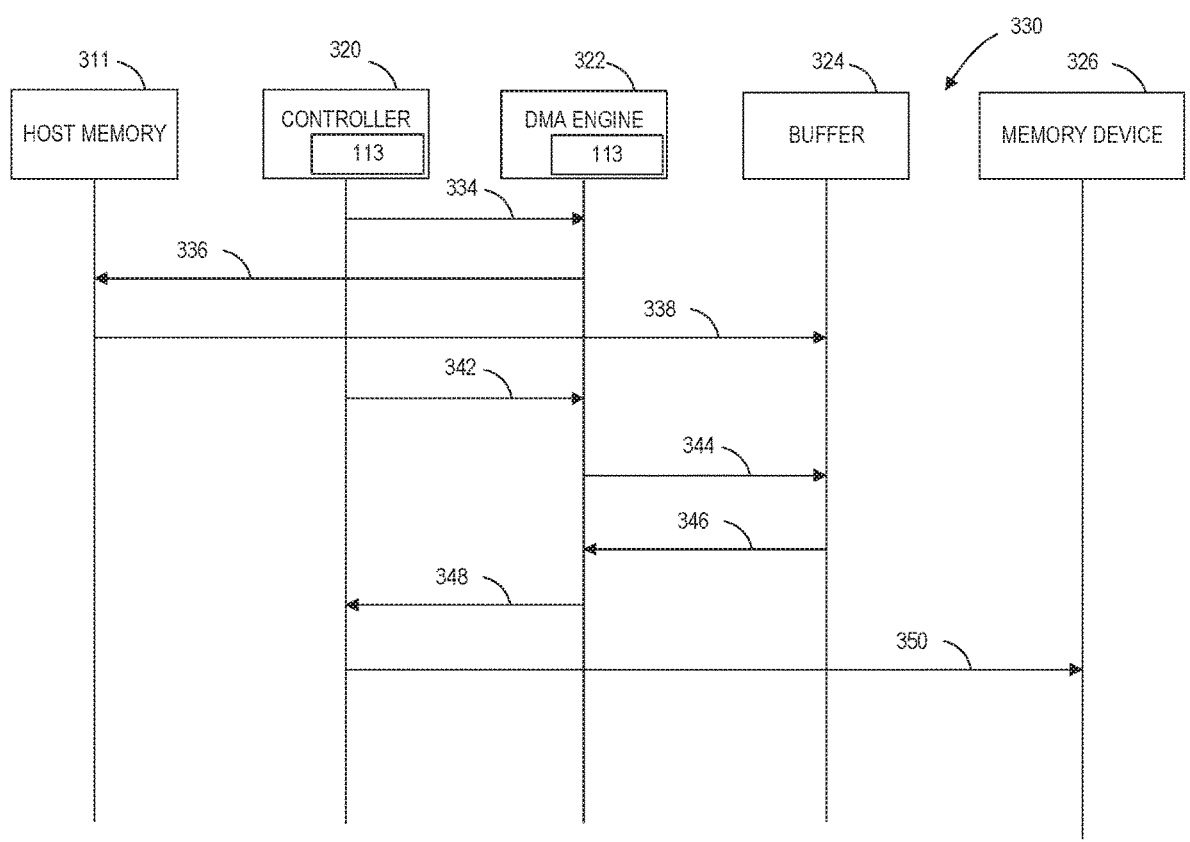
FIG. 3 illustrates an example of a command flow diagram for performing a write operation for duplicating data on a storage system, in accordance with some embodiments of the present disclosure.

FIG. 3 illustrates an example of a command flow diagram 330 for performing a write operation for duplicating data on a storage system, in accordance with some embodiments of the present disclosure. The DMA engine 322 (e.g., DMA engine 222 in FIG. 2) and/or controller 320 (e.g., controller 111 in FIG. 1 and/or controller 220 in FIG. 2) can include the data repeating component (e.g., data repeating component 113 of FIG. 1 and FIG. 2) and/or sub-components of data repeating component 113. One or more methods described in accordance with the flow diagram 330 can be performed by the data repeating component 113. One or more methods described in accordance with the flow diagram 330 can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof.

The data repeating component 113 can retrieve the data from host memory 311 (e.g., host memory 130 in FIG. 1) and store the data in the buffer 324 (e.g., buffer 224 in FIG. 2). The data repeating component 113 can use the data stored in the buffer 324 to repeatedly write the data to the memory device(s) 326 (e.g., memory device(s) 112A to 112N in FIG. 1 and/or memory device(s) 226 in FIG. 2). The functionality of the data repeating component 113 can be implemented by the controller 320 and/or one or more components (e.g., DMA engine 322) within a storage system, as described in greater detail below.

For example, the controller 320 can receive and/or process a command, such as a write same command, to duplicate data from a host to a memory device of a storage system. The write same command can include a host address (e.g., a source address) and/or a storage address (e.g., a destination address). The host address can describe a memory address corresponding to a location where the write same data is stored in the host memory 311. The storage address can describe a memory address corresponding to a location where the write same data is to be stored in the memory device 326.

The host address and/or the storage address can be a first address in a block of memory. The host address and/or the storage address can be an address of a header of a memory block. The host address and/or the storage address can be a physical memory address and/or a virtual memory address.

The write same command can include a destination size (also hereinafter referred to as "storage size"). The storage size can be a size of a block of memory to which the data is to be stored (also hereinafter referred to as "write same data"). The storage size can be greater than a size of the write same data. For example, the storage size can be a multiple of the size of the write same data. The write same command can describe that the write same data is to be saved a quantity of times sufficient to fill a block of the memory device 326 having a storage size. For example, the write same data can be stored in the memory device 326 a quantity of times sufficient to fulfill the write same command. In some examples, a size of the write same data can be a same size as a size of the storage size.

In some examples, the write same command includes a quantity of times that the write same data is to be stored in the memory device 326. For example, a write same command can include a numeric value that describes a quantity of times (instances) the write same data is to be stored to the memory device 326. For example, the write same command can describe that the write same data is to be stored in the memory device 326 four times. The write store command can be fulfilled after the write same data is stored a fourth time in the memory device 326. The controller 320 can store the write operation request until the write operation request is fulfilled.

At 334, the controller 320 can provide a data request command in response to receiving the write same command. The DMA engine 322 can receive the data request command. The data request command can instruct the DMA engine 322 to retrieve the write same data from the host memory 311. The data request command can include the host address, corresponding to the host memory 311, where the data ("write same data") pertaining to the command is stored. The data request command can also include the size of the write same data. The data request command can also include other data that can be used to retrieve the write same data. For example, the data request command can include an identifier of the host system and/or an identifier of the host memory 311, among other types of data that can be used to identify the host system, the host memory 311, and/or the location of the write same data. The DMA engine 322 can also store the data request command and/or any information included in the data request command.

In some examples, the host address, the size of the write same data, the identifier of the host system, and/or the identifier of the host memory 311 are received from the write same command and provided to the DMA engine 322 in the data request command. In other examples, one or more of the host address, the size of the write same data, the identifier of the host system, and/or the identifier of the host memory 311 can be generated by the controller 320 and provided to the DMA engine 322. For example, the controller 320 can be configured by the host system with the host address, the size of the write same data, the identifier of the host system, and/or the identifier of the host memory 311. The controller 320 can then utilize one or more of the host address, the size of the write same data, the identifier of the host system, and/or the identifier of the host memory 311 to generate the data request command independent of the write same command and/or in combination with the write same command. For example, the controller 320 can utilize a previously saved host address if the write same command does not include the host address.

At 336, the DMA engine 322 can access the write same data at the host memory 311, retrieve the write same data from the host memory 311, and/or request that the write same data be transferred from the host memory 311 to buffer 324. The DMA engine 322 can access the host memory 311 utilizing the information contained in the data request command. At 338, the write same data can be transferred from the host memory 311 and stored in the buffer 324. In some embodiments, the write same data is copied from the host memory 311 to the buffer 324. In some examples, the write same data can be transferred from the host memory 311 to the buffer 324 and to the controller 320 simultaneously (e.g., at the same time). Transferring the write same data to the buffer 324 and the controller 320 simultaneously can allow the controller 320 to initially store the write same data in the memory device 326 without making additional calls to the DMA engine 322 and/or the buffer 324. Subsequently, the write same data can be stored in the memory device 326 as described below.

At 342, the controller 320 can generate and provide a write same operation to the DMA engine 322. The write same operation can instruct the DMA engine 322 to transfer the write same data from the buffer 324 to the memory 326. The DMA engine 322 can receive the write same operation. The DMA engine 322 can process and/or implement the write same operation. At 344 and 346, the DMA engine 322 can transfer the write same data from the buffer 324 to itself (e.g., DMA engine 322). In some embodiments, the DMA engine 322 creates a copy of the write same data that is stored in the buffer 324. At 348, the DMA engine 322 can provide the write same data to the controller 320. At 350, the controller 320 can provide the write same data to the memory device 326 for storage.

The performance of the write same operation can include the operations and/or commands performed in each of 324, 344, 346, 348, and/or 350. Performing a write same operation can store a single instance of the write same data in the memory device 326. Accordingly, one or more write same operations and a data request command can be performed to perform the write same command. The commands and/or operations performed in each of 342, 344, 346, 348, and/or 350 can be performed repetitively until the write same command is satisfied (e.g., fulfilled).

A size of the write same data retrieved from the buffer 324 can be smaller than a size of the block of memory where the write same data is being stored. As such, the commands and/or operations performed in each of the 342, 344, 346, 348, and/or 350 can be performed a quantity of times. The controller 320 can schedule the execution of each of 342, 344, 346, 348, and 350. Accordingly, the controller 320 can schedule a number of data operations (e.g., read operation, program operation, write operation, erase operation) that may or may not be related to the write same command between at least one of the operation performed at 342, 344, 346, 348, and/or 350. For example, a first set of write same operations can be performed to perform a write same command. The set of write same operations includes one or more write operations to write the write same data to the memory device 326. The controller 320 can schedule a set of data operations (e.g., read operation, program operation, write operation, erase operation), which are not related to the write same command, between the first set of write same operations and a second set of write same operations. The set of data operations (e.g., read operation, program operation, write operation, erase operation) can be performed at a location on memory device 326 unrelated to the write same command. The set of data operations not associated with the write same command can be performed. Subsequently, the controller 320 can resume an operation pertaining to the write same command, for example, by performing one or more of the second set of write same operations until the write same command is satisfied. A set of operations can include one or more operations.

The set of data operations can be operations that do not contribute to the write same command, the write same operation, and/or the data request command. The set of data operations can utilize controller 320 resources that may become unavailable for transferring the write same data to the memory device 326. In some examples, the set of data operations can be executed between each write same operation. A number of data operations can also be executed between a first set of write same operations and subsequent sets of write same operations.

In some examples, the controller 320 can schedule a performance of a set of data operations that are unassociated with the write same command while the DMA engine 322 stores the write same data to the write same data buffer 324. For example, the DMA engine 322 can perform a set of write same operations while the controller 320 performs a set of data operations unassociated with the write same command.

The controller 320 can schedule the unassociated data operations in response to receiving an access command from the host system at the controller 320 and/or an interface of the storage system. For example, the write same command can be interrupted to perform an access operation at the controller 320.

After the write same data is stored in the memory device 326, the DMA engine 322 can report a completion of a set of write same operations to the controller 320. The controller 320 can determine based on the information contained in the write same command whether the write same command has been satisfied.

For example, the controller 320 can store a counter describing the quantity of instances of the write same data that have been stored in the memory device 326. The controller 320 and/or the DMA engine 322 can continue to perform write same operations until the counter is equal to a quantity of times the write same data is to be stored in the storage memory 326, as described in the write same command.

In some examples, the controller 320 can store a counter that describes a size of the block of the memory device 326 that has been occupied with instances of the write same data. The size of the block of the memory device 326 that has been occupied can be used to determine a size of the block of the memory device 326 that has not been occupied. The write same command can be satisfied if the size of the block of the memory device 326 that has not been occupied is equal to zero.

The controller 320 can also store a counter that describes the combined size of each instance of the write same data stored in the memory device 326. The write same command can be satisfied if the combined size of the instances of the write same data stored in the memory device 326 is equal to or greater than the size of the block of the memory device 326 where the write same data is to be stored.

In some embodiments, a satisfaction of the write same command can be communicated through a flag internal to the controller 320. In other embodiments, upon the satisfaction of the write same command, the write same data can be deleted from the buffer 324. The satisfaction of the write same command can include freeing the host memory 311 that is storing the write same data. In some examples, the write same data can be deleted from the host memory 311 upon transferring the write same data from the host memory 311 to the buffer 324 and/or the DMA engine 322. The satisfaction of the write same command can also include reporting the completion of the write same command to the host system.

Figure 4:
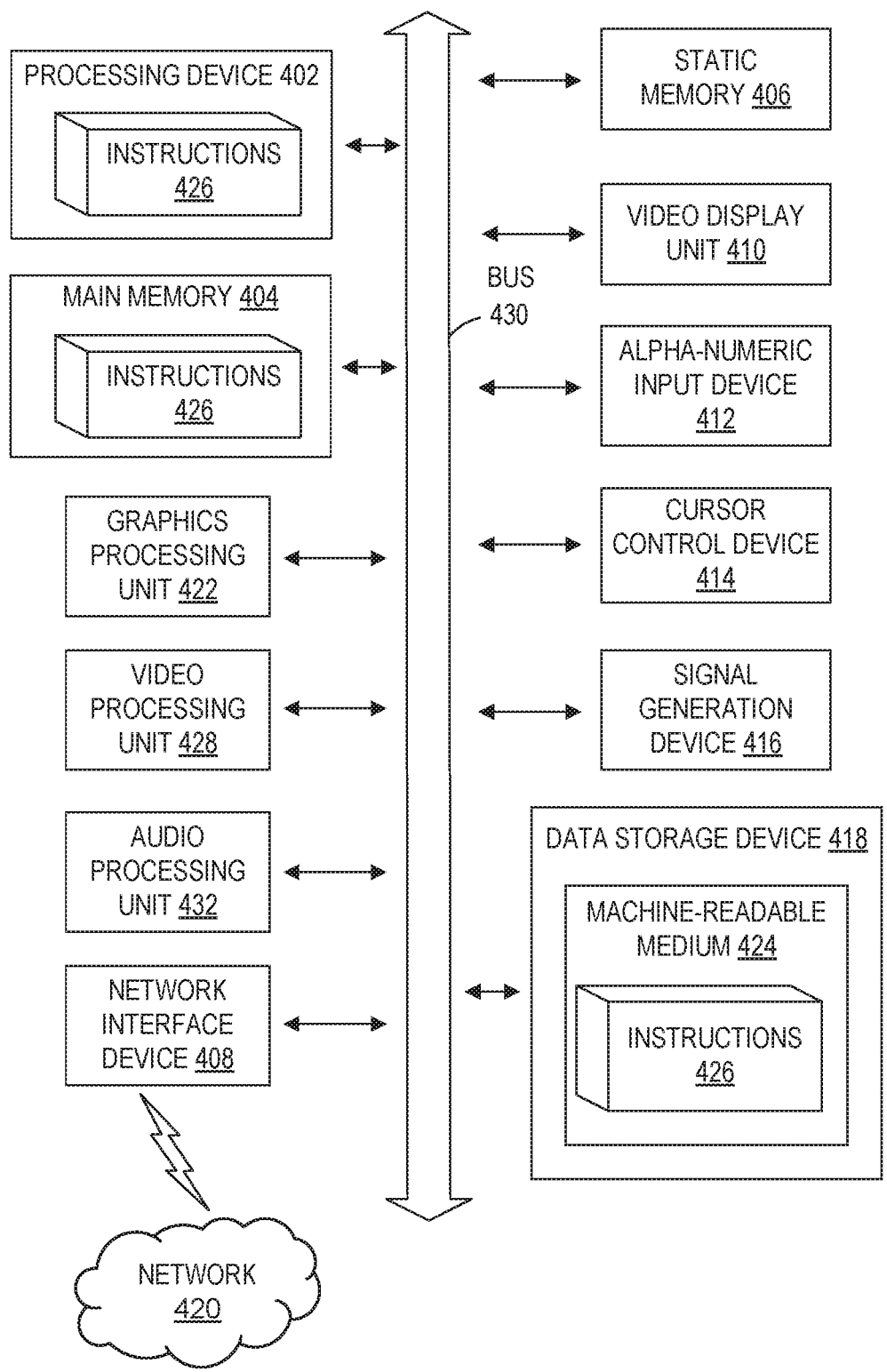
FIG. 4 is a block diagram of an example computer system in which implementations of the present disclosure may operate.

FIG. 4 illustrates an example machine of a computer system 400 within which a set of instructions, for causing the machine to perform any one or more of the methodologies discussed herein, may be executed. For example, the computer system 400 may include or utilize a storage system (e.g., storage system 110 of FIG. 1) or may be used to perform the operations of a controller (e.g., to execute an operating system to perform operations corresponding to the data repeating component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media. The machine-readable storage medium 424, data storage device 418, and/or main memory 404 may correspond to the storage system 110 of FIG. 1.

In one implementation, the instructions 426 include instructions to implement functionality corresponding to a data repeating component (e.g., data repeating component 113 of FIG. 1). While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "retrieving" or "performing" or "storing" or "delaying" or "continuing" or "writing" or "rescheduling" or "scheduling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
  receiving, at a storage system, a command from a host system to duplicate data on the storage system;
  in response to receiving the command, retrieving data corresponding to the command from host memory of the host system; and
  performing a plurality of write operations on one or more memory devices of the storage system to fulfill the command by writing the data repeatedly to sequential respective address locations corresponding to the one or more memory device of the storage system; and
  wherein performing each one of the plurality of write operations comprises writing the data to the one or more memory devices of the storage system without a subsequent retrieval of the data from the host memory.

2. The method of claim 1, further comprising storing the data in a dedicated buffer of the storage system.

3. The method of claim 2, further comprising:
performing a first number of the plurality of write operations;
prior to completing execution of the command, delaying performance of a remaining number of the plurality of write operations; and
continuing performance of the remaining number of the plurality of write operations corresponding to the command.

4. The method of claim 3, wherein performing the remaining number of the plurality of write operations corresponding to the command comprises retrieving the data from the dedicated buffer for each respective one of the remaining number of the plurality of write operations.

5. The method of claim 3, wherein delaying is in response to receiving a request to perform a data operation not related to the command.

6. The method of claim 1, wherein the command is a write same command.

7. The method of claim 1, wherein writing the data repeatedly further comprises performing the plurality of write operations to the sequential respective address locations corresponding to the memory devices of the storage system.

8. A storage system, comprising:
a buffer;
a memory device; and
a processing device, operatively coupled with the memory device and the buffer, to:
receive a command from a host system, external to the storage system, to duplicate data on the storage system;
retrieve the data specified by the command from host memory of the host system;
a receiving interface configured to store the data in the buffer and provide the data to a DMA engine concurrently; and
wherein the processing device is further configured to:
perform a plurality of write operations on the memory device by storing a plurality of copies of the data, retrieved from the buffer and provided by the DMA engine, on the memory device without a subsequent retrieval of the data from the host memory.

9. The storage system of claim 8, wherein the command comprises a first address of the host memory where the data is stored and a second address of the memory device where the data is to be duplicated.

10. The storage system of claim 8, wherein the command is write same command.

11. The storage system of claim 8, wherein the processing device is further configured to:
receive a request to perform an operation unrelated to the command; and
in response to receiving the request to perform the operation unrelated to the command, reschedule performance of the plurality of write operations on the memory device.

12. An apparatus comprising:
a buffer;
a memory device;
a direct memory access (DMA) engine;
a processing device configured to:
receive a write same command from a host system, wherein the host system is coupled to the apparatus via an interface;
in response to receiving the write same command, retrieve, via the DMA engine, data, specified by the write same command, from a host memory of the host system;
a receiving interface configured to store the data in the buffer and provide the data to the DMA engine concurrently; and
wherein the processing device is further configured to:
perform a first plurality of write same operations for the write same command using the data provided to the DMA engine;
perform a plurality of data operations unrelated to the write same command; and
perform a second plurality of write same operations for the write same command using the data stored in the buffer, wherein the first plurality of write same operations and the second plurality of write same operations comprises transferring a plurality of instances of the data from the buffer to the memory device for a single write same command.

13. The apparatus of claim 12, wherein a size specified by the write same command corresponds to a total amount of data to be written to the memory device in association with executing the write same command.

14. The apparatus of claim 13, wherein a size of data being written to the memory device from executing the first and second plurality of write same operations is a fraction of the size specified by the write same command.

15. The apparatus of claim 13, wherein the size specified by the write same command is a multiple of a write size of the memory device.

16. The apparatus of claim 12, wherein a size specified by the write same command is a multiple of a size of the buffer.

17. The apparatus of claim 12, wherein the processing device is further configured to:
perform the first plurality of write same operations to a first block of the memory device; and
perform the second plurality of write same operations to a second block of the memory device, wherein the first block and the second block are continuous and adjacently addressed blocks of the memory device.

18. The apparatus of claim 12, wherein the processing device is further configured to perform the second plurality of write same operations for the write same command in response to detecting completion of performing the plurality of data operations that are unrelated to the write same command.

19. The apparatus of claim 12, wherein the processing device is further configured to schedule performance of the plurality of data operations after completion of the first plurality of write same operations and before performing the second plurality of write same operations.

20. The apparatus of claim 12, wherein the processing device is further configured to:
transfer a first plurality of instances of the data from the buffer to the memory device to perform the first plurality of write same operations; and
transfer a second plurality of instances of the data from the buffer to the memory device to perform the second plurality of write same operations, wherein the first plurality of write same commands and the second plurality of write same commands comprise the plurality of write same commands.

\* \* \* \* \*